E. Amende,

Fountain.

No. 104,921.  Patented July 5, 1870.

Witnesses:
Joh. Becker.
S. S. Mabee

Inventor:
E. Amende
Per Munn & Co
Attorneys.

gement with an air-vessel, two water-vessels, and the basin, of a system of flexible air and water-pipes, and stop-cocks for the application of the compressed air, to force the water alternately from one of the water-vessels, while it flows back to the other, and *vice versa*, all as hereinafter more fully specified.

United States Patent Office.

EDWARD AMENDE, OF PARIS, KENTUCKY.

Letters Patent No. 104,921, dated July 5, 1870.

IMPROVEMENT IN SELF-FEEDING FOUNTAINS.

The Schedule referred to in these Letters Patent and making part of the same.

*To all whom it may concern:*

Be it known that I, EDWARD AMENDE, of Paris, in the county of Bourbon and State of Kentucky, have invented a new and useful Improvement in Self-feeding Fountains; and I do hereby declare that the following is a full, clear, and exact description thereof, which will enable others skilled in the art to make and use the same, reference being had to the accompanying drawing forming part of this specification.

This invention relates to improvements in fountains, such as are operated by compressed air impelling water, which is returned and used over; and It consists in a novel arrangement with an air-vessel, two water-vessels, and the basin, of a system of flexible air and water-pipes, and stop-cocks for the application of the compressed air, to force the water alternately from one of the water-vessels, while it flows back to the other, and *vice versa*, all as hereinafter more fully specified.

Figure 1:
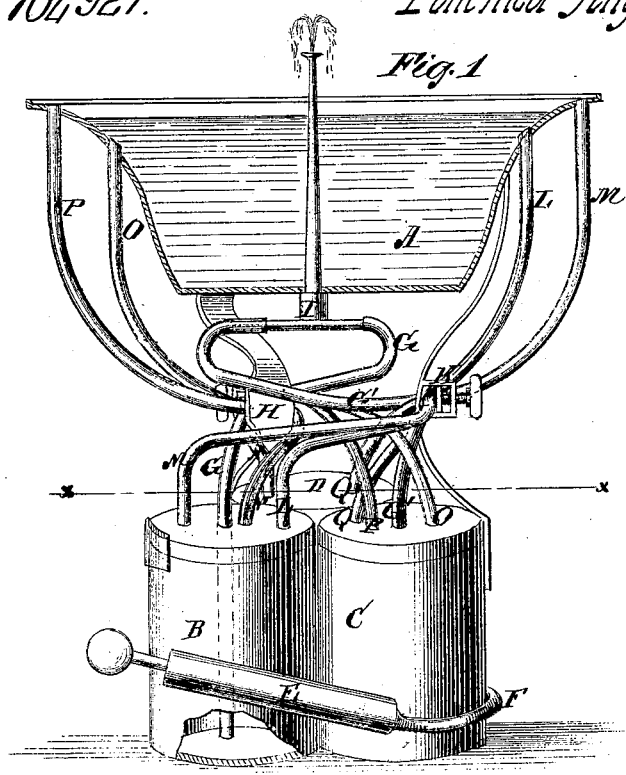
Figure 2:
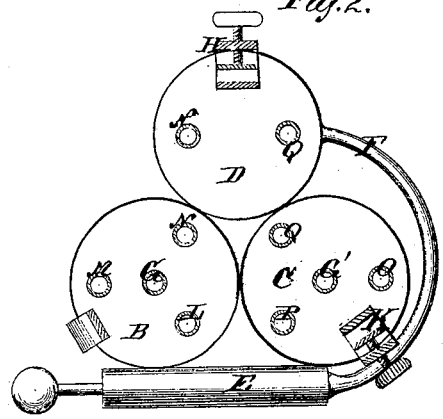

Figure 1 is a side view of my improved fountain, partly in section and partly in elevation, and Figure 2 is a horizontal section of the same, taken on the line *x x* of fig. 1.

A is the basin;

B, one water-vessel;

C, the other; and

D is the air-vessel.

E is the air-pump, connected by pipe F with vessel D.

G is the water-pipe leading from near the bottom of vessel B, through clamping-cock H, to nozzle I, for discharging into the basin A.

G' is a similar pipe leading from vessel C, through clamping-cock K, to the nozzle I.

L is a return-water pipe leading from the basin back to vessel B, through clamp-cocks K.

M is an air-escape pipe leading from vessel B to the basin-opening thereat, at a higher point than the opening of pipe L.

N is an air-pipe leading from vessel D, through clamp-cocks H, to vessel B.

O is a feed-water pipe leading back from the basin A, through clamp-cocks H, to vessel C.

P is the air-escape pipe from vessel C, through clamp-cock H to vessel A, opening thereat above the mouth of pipe O; and Q is the air-pipe leading from air-vessel D, through clamp-cock K to water-vessel C.

To set this fountain in operation, one of the clamp-cocks, say K, is closed, to clamp the flexible pipes together; the basin A is then filled with water above the mouths of the pipes L O; the water will then flow through pipe O to vessel C, filling it, the air therein escaping through pipe P; then clamp-cock H is closed, and K is opened, and the vessel B is charged with air, by the pump E, to the required pressure; the opening of clamp-cock K allows the air to pass through tube Q, and act on the water in C, forcing it up through pipe G' to the nozzle I, until all the water is forced out at the same time it flows back through L to vessel B, and the air therein flows through pipe M.

The clamp K is then closed and H opened; the air then acts on the water in B, passing through air-pipe N thereto, forcing it to the nozzle through pipe G, and it flows back to C through pipe O, the air escaping from C through pipe P, and so on, changing the application of the air and the water alternately from one water-vessel to another; a continuous flow of water may be maintained by filling the air-vessel D from time to time by means of the pump.

An indicator may be attached to the air-vessel, to show the pressure of the air, and a cock may be applied to the nozzle below the vessel A, to regulate the size and height of the water-jet.

It will be seen that, by this arrangement of the flexible pipes and the clamp-cocks, I am enabled to make the necessary changes in opening and closing the pipes by the use of two cocks only, whereas, by the ordinary arrangement of one cock for each pipe, eight cocks would be required, and would have to be manipulated at each change.

Having thus described my invention,

I claim as new and desire to secure by Letters Patent—

1. The combination of the water-vessels B C, air-vessels D, basin A, discharge-pipes G G', return-pipes D L, air-escape pipes P, air-supply pipes N Q, and air-pump E, all substantially as specified.

2. The combination of the clamp-cocks with the water-return pipe and air-escape pipe of one water-vessel and the air-supply pipe and water-discharge pipe of the other, substantially as specified.

E. AMENDE.

Witnesses:
L. FRANK,
VENUS A. BOOS.